(12) United States Patent
Lyon et al.

(10) Patent No.: US 6,794,627 B2
(45) Date of Patent: Sep. 21, 2004

(54) AGGREGATION OF ACTIVE PIXEL SENSOR SIGNALS

(75) Inventors: Richard F. Lyon, Los Altos, CA (US); Robert S. Hannebauer, Sunnyvale, CA (US); Richard M. Turner, Mountain View, CA (US); Carver A. Mead, Santa Clara, CA (US)

(73) Assignee: Foveon, Inc., Santa Clara, CA (US)

( * ) Notice: Subject to any disclaimer, the term of this patent is extended or adjusted under 35 U.S.C. 154(b) by 0 days.

(21) Appl. No.: 10/001,438

(22) Filed: Oct. 24, 2001

(65) Prior Publication Data

US 2003/0164441 A1 Sep. 4, 2003

(51) Int. Cl.[7] .................................................. H04N 3/14
(52) U.S. Cl. .................. 250/208.1; 348/308; 250/214 A
(58) Field of Search .......................... 250/208.1, 214 A, 250/214 LA, 214 LS, 214.1, 214 DC; 348/317, 318, 319, 302, 303, 304, 308; 257/443

(56) References Cited

U.S. PATENT DOCUMENTS

| | | |
|---|---|---|
| 5,262,871 A | 11/1993 | Wilder et al. |
| 5,304,790 A | 4/1994 | Arnold |
| 5,402,169 A | 3/1995 | Takase et al. |
| 5,452,004 A | 9/1995 | Roberts |
| 5,500,674 A | 3/1996 | Takase et al. |
| 5,733,382 A | 3/1998 | Hanoka |
| 5,773,832 A | 6/1998 | Sayed et al. |
| 5,848,123 A | 12/1998 | Strömmer |
| 5,909,026 A | 6/1999 | Zhou et al. |
| 5,949,483 A * | 9/1999 | Fossum et al. ............. 348/303 |
| 5,965,875 A | 10/1999 | Merrill |
| 5,970,115 A | 10/1999 | Colbeth et al. |
| 5,973,311 A | 10/1999 | Sauer et al. |
| 6,057,539 A | 5/2000 | Zhou et al. |
| 6,084,229 A | 7/2000 | Pace et al. |
| 6,255,638 B1 | 7/2001 | Eräluoto et al. |
| 6,255,680 B1 | 7/2001 | Nakashiba |
| 6,480,227 B1 * | 11/2002 | Yoneyama ................... 348/308 |

FOREIGN PATENT DOCUMENTS

| | | |
|---|---|---|
| WO | WO 99/48281 | 9/1999 |
| WO | WO 00/51345 | 8/2000 |

OTHER PUBLICATIONS

Mead, C. (1989). "Aggregating Signals" Chapter 7 *In Analog VLSI and Neural Systems*. C. Koch ed., Addison–Wesley Publishing Company, Inc., pp. 101–124.

* cited by examiner

*Primary Examiner*—David V. Bruce
*Assistant Examiner*—Hoon Song
(74) *Attorney, Agent, or Firm*—Sierra Patent Group, Ltd.

(57) ABSTRACT

An image sensor includes a plurality of active pixel sensors arranged in an array. Each active pixel sensor includes a photosensor that generates a sensor signal nominally indicative of an intensity of light incident on the photosensor and a follower-type amplifier that couples the sensor signal to an output of the active pixel sensor to provide a buffered sensor signal. A column line is provided for each column in the array, and each column line is coupled to the output of the active pixel sensors associated with that column. Row select signal generating circuitry is configured to substantially simultaneously select a set of plural particular rows of the array such that each of the active pixel sensors in the selected set of plural particular rows substantially simultaneously provides the buffered sensor signal for that pixel sensor to the column line for the column to which that pixel sensor belongs such that an output node of the column line indicates a collective output signal for the active pixel sensors in the selected set of plural particular rows, belonging to that column. Column select signal generating circuitry configured to substantially simultaneously select a set of plural particular columns of the array such that the output nodes for the selected plural particular columns are substantially simultaneously coupled to an output node of the image sensor.

35 Claims, 12 Drawing Sheets

AGGREGATION OF ACTIVE PIXEL SENSOR SIGNALS

TECHNICAL FIELD

The present application relates to sensor signals from pixel sensors of an image sensor. More particularly, the present application relates to aggregating signals from active pixel sensors of an image sensor to achieve different readout resolutions without excessive aliasing artifacts.

BACKGROUND

An image sensor typically includes an array of pixel sensors arranged in an array. In some instances, it is desirable to "bin" the outputs of such a pixel sensor to accomplish a reduced-resolution image with better image quality than is achievable by simply subsampling.

One known application of binning includes generating a reduced resolution video image or viewfinder "preview" image from an imager that is capable of producing a high-resolution still image. Another binning application includes operating, in a super-high-speed low-resolution mode, an imager that is capable of producing a standard or high-resolution video output.

There are a number of ways to achieve binning. For example, with an image sensor that has charge-coupled device (CCD) pixel sensors, binning is typically achieved by clocking the charges produced by the individual CCD pixel sensors into a summing well. The summed charge is then typically converted to a voltage for further processing. For CCD imagers, a well-known benefit to binning is the improvement of the signal-to-noise ratio. See, for example, U.S. Pat. No. 5,773,832 to Sayed et al.

Recently, there has been a trend towards using Complementary Metal Oxide Semiconductor (CMOS) imagers. CMOS imagers have an advantage that they can be read out more flexibly than CCD imagers. Furthermore, CMOS imagers can be made with standard silicon processes in high-volume foundries. As a result, as improvements are made in semiconductor processes and material technology, CMOS imagers can benefit from those improvements.

Direct binning of the outputs of CMOS imager pixel sensors has been limited to collecting charges from the photodiodes of passive pixel sensors and directly mixing the charges; see, for example, U.S. Pat. No. 5,970,115 to Colbeth et al, and U.S. Pat. No. 5,262,871 to Wilder et al.

Binning of outputs from active pixel sensors has been limited to special binning circuits added onto column lines, to mix signals across columns, and across sequential row reads, by charge sharing. See, for example, U.S. Pat. No. 5,949,483 to Fossum et al. Another binning approach utilized with CMOS imagers having active pixel sensors is described in U.S. Pat. Nos. 5,909,026 and 6,057,539 to Zhou et al. The Zhou patents disclose storing into a frame memory array data corresponding to signals output from an active pixel sensor array. That is, each active pixel sensor in an active pixel sensor array has a corresponding memory cell in the frame memory array. Each memory cell includes a capacitor into which the output signal from the corresponding active pixel sensor is sampled. A memory row decoder and column select (for example, operating under the control of a resolution control circuit) control the resolution of the image data read out from the frame memory array. With the conventional active-pixel-sensor binning approaches just described, each row is read separately, so there is no speed advantage over non-binning approaches.

What is desired is a simple and flexible approach to combining the outputs of active pixel sensors of an image sensor.

SUMMARY

In accordance with an aspect of the invention, an active pixel sensor imager is configured to aggregate the follower-type amplifier outputs of subgroups of the active pixel sensors by controlling the imager to couple together the follower-type amplifier outputs of those active pixel sensors to an output node for each column. Row select signal generating circuitry is employed to accomplish the selection. Column select signal generating circuitry is employed to accomplish aggregation of the signals at the column output nodes to an imager output node. Advantages are that pixel noise is reduced, the frame readout time is reduced, and image aliasing is reduced.

BRIEF DESCRIPTION OF THE DRAWINGS

FIG. 10 is a diagram of color pixel binning patterns in a Bayer pattern filter mosaic.

DETAILED DESCRIPTION

Figure 1A:
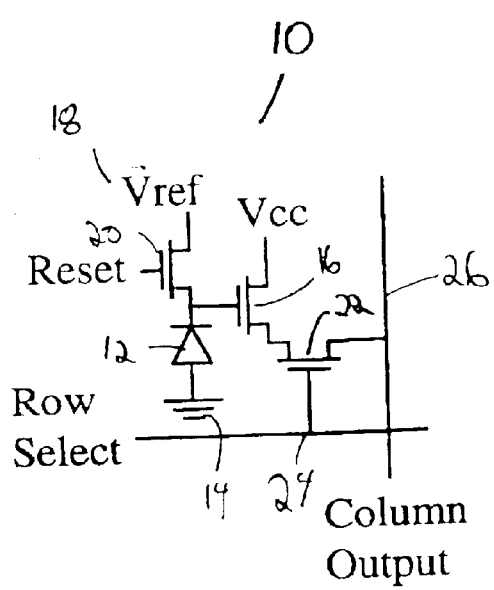
FIG. 1A is a circuit diagram depicting an example of an active pixel sensor as known in the prior art.
Figure 1B:
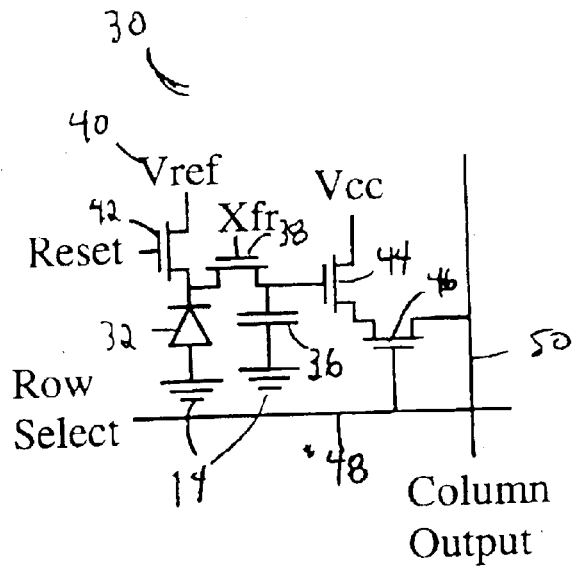
FIG. 1B is a circuit diagram depicting another example of an active pixel sensor as known in the prior art.
Figure 1C:
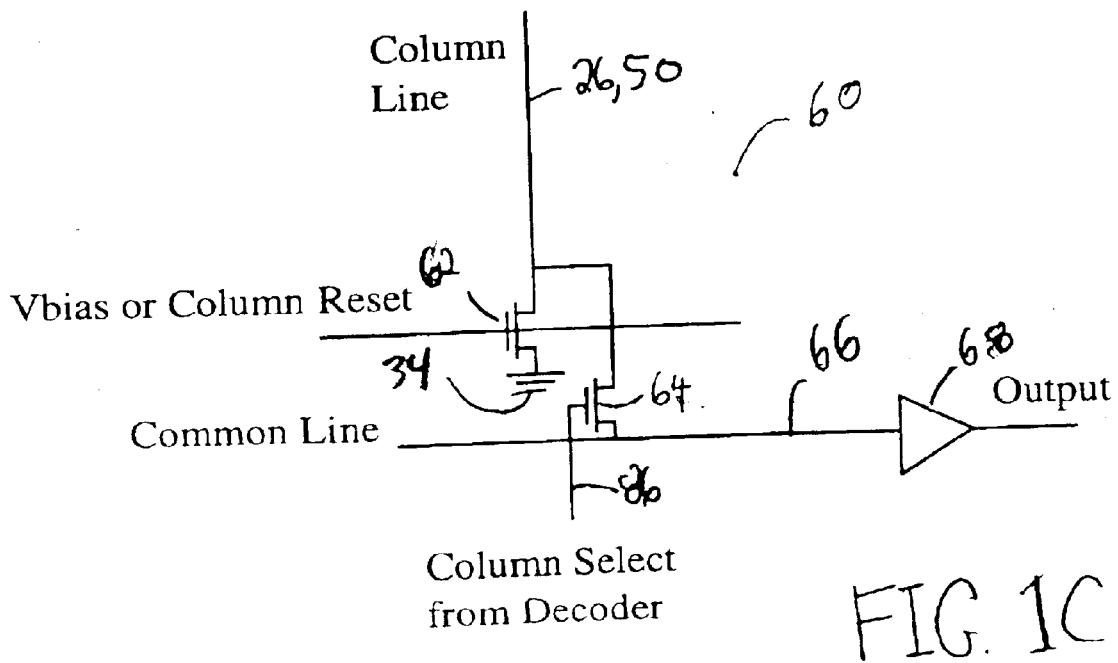
FIG. 1C is a circuit diagram depicting circuitry for column line selection and reset for a single column line.
Figure 2A:
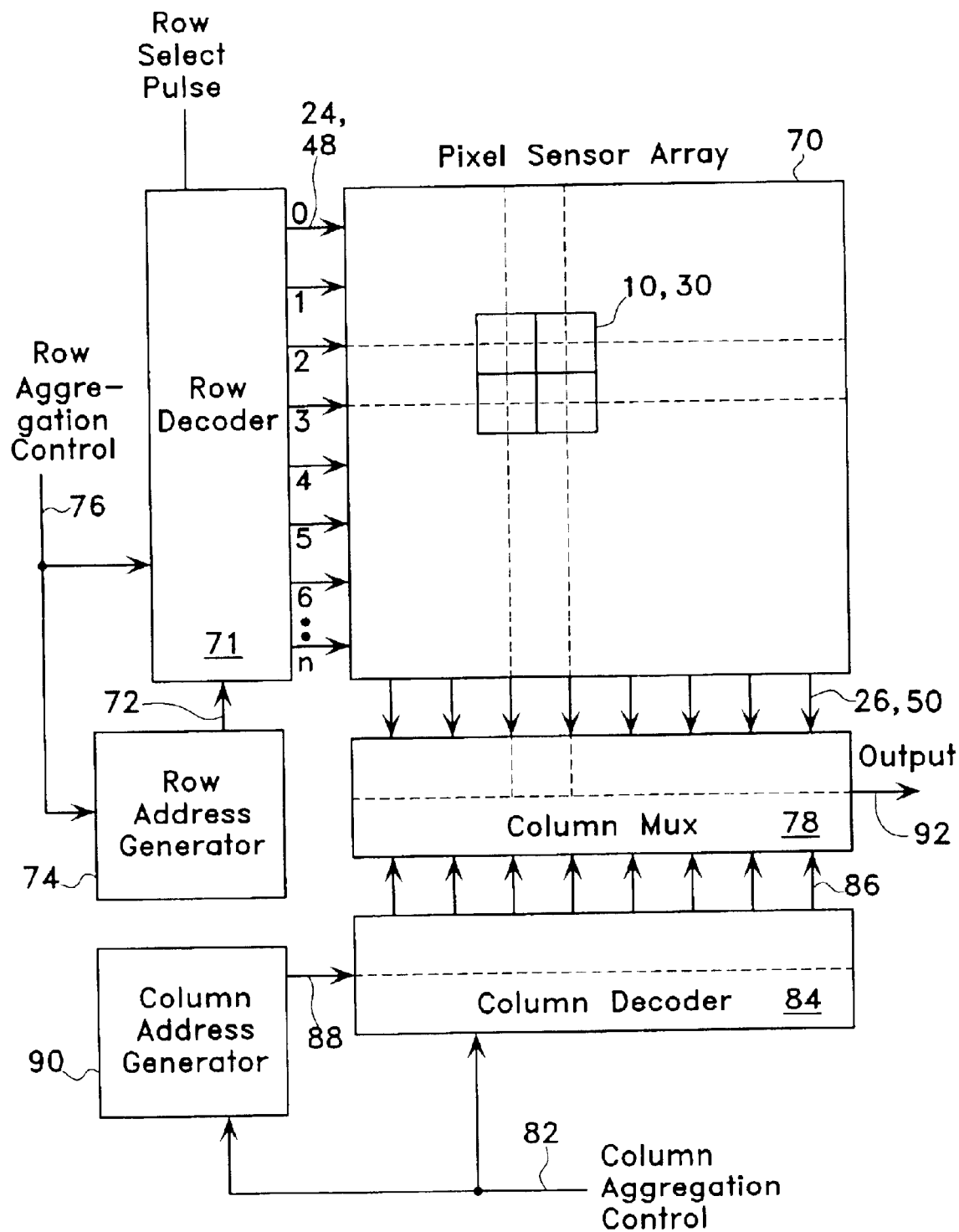
FIG. 2A is a block diagram depicting an example of an image sensor including an array of active pixel sensors (for example, of the type illustrated in FIG. 1) and surrounding architecture as known in the prior art.
Figure 3A:
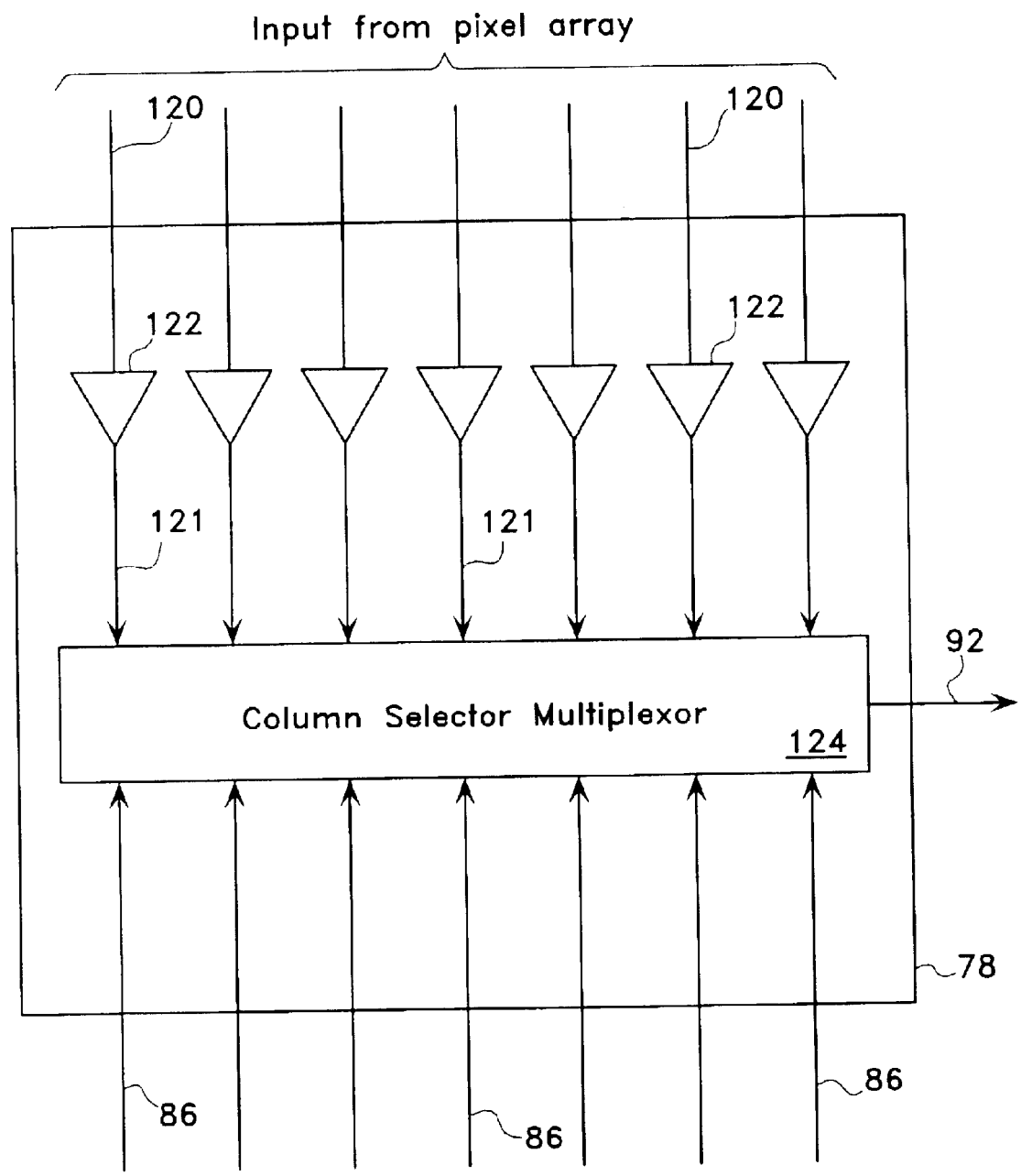
FIGS. 3A and 3B are block diagrams depicting examples of the column multiplexor of the FIG. 2A block diagram.
Figure 3B:
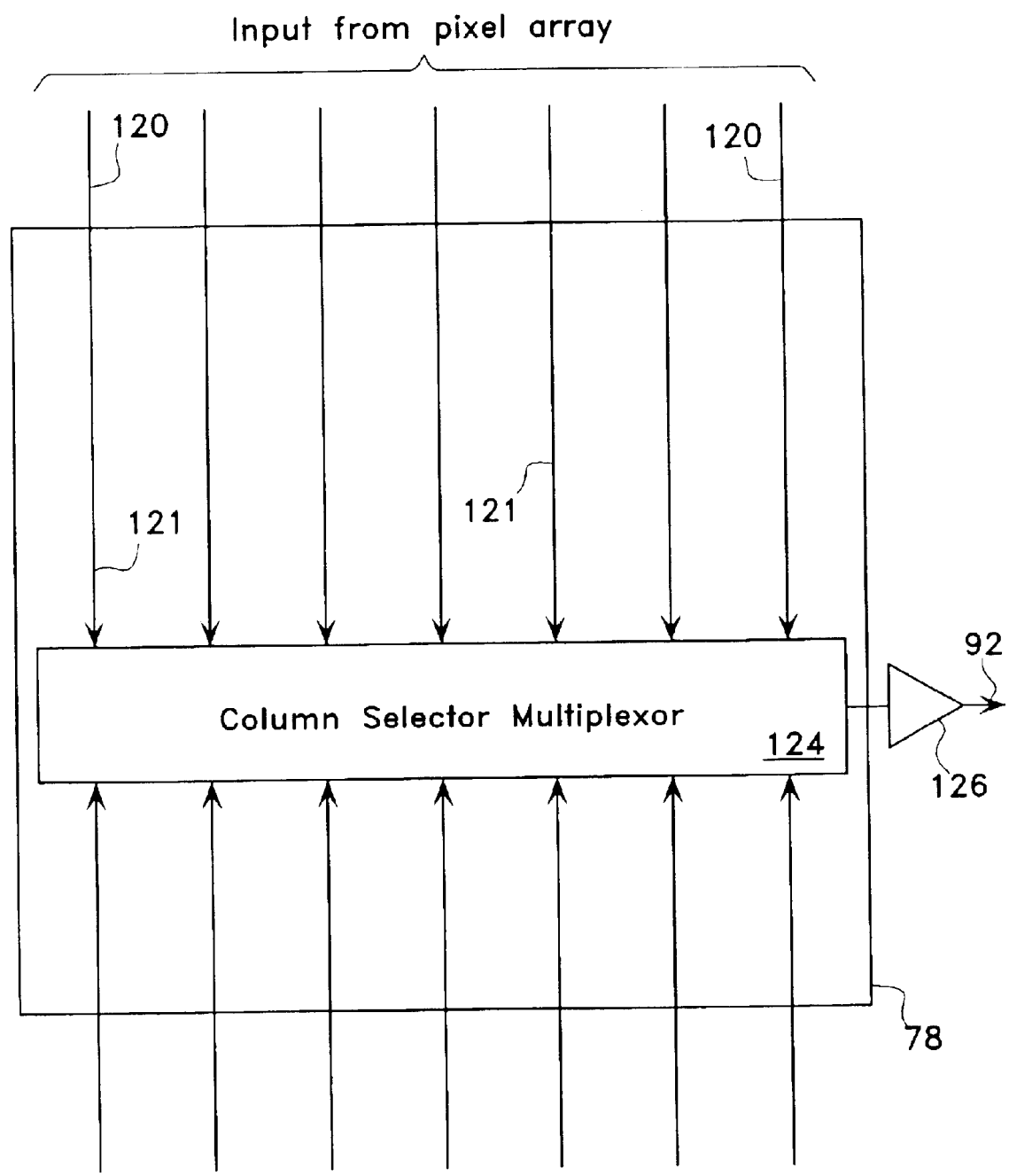

In accordance with an embodiment of the invention, particular active pixel sensors of an array of active pixel sensors are selected such that the outputs of the selected active pixel sensors are aggregated. Before discussing how such aggregation is effected, though, it is useful to first describe a conventional image sensor that is comprised of conventional active pixel sensors. FIG. 1A depicts a circuit diagram of one example of an individual active pixel sensor; FIG. 1B depicts a circuit diagram of another example of an individual active pixel sensor; and FIG. 1C depicts a circuit diagram illustrating selection and reset of a single column line. FIG. 2A depicts a block diagram of a pixel sensor array and surrounding architecture; and FIGS. 3A and 3B depict block diagrams of a column multiplexor.

Starting with a description of an individual active pixel sensor, FIG. 1A illustrates the circuitry of one conventional active pixel sensor 10. The active pixel sensor 10 includes a photodiode 12 having its anode connected to a fixed voltage potential 14 (shown in FIG. 1A as ground). The cathode of the photodiode 12 is connected to a follower-type amplifier 16. The follower-type amplifier 16 may be, for example, a source-follower amplifier or an emitter-follower amplifier for which the voltage gain from input to output of the follower-type amplifier is less than one, such that the output of the follower-type amplifier is a buffered voltage. The cathode of the photodiode 12 is also connectable to a reference potential Vref 18 via a photosensor reset switch 20 so that the photodiode 12 is reverse biased. The output of the follower-type amplifier 16 is attached to a row select switch 22, which is connected to a row select line 24 and a column line 26.

The FIG. 1A active pixel sensor 10 may be operated as follows. First, the active pixel sensor 10 is reset by turning on the photosensor reset switch 20. Then the photosensor reset switch 20 is turned off so that integration of photocurrent from photodiode 12 can begin. The current from the photodiode 12 is integrated on the follower-type amplifier 16 input node capacitance to form a voltage signal. At the appropriate time, the voltage on the row select line 24 is raised, which activates the row select switches 22 (e.g., as shown, a field effect transistor) in the pixel sensor 10 (and, in fact, activates the row select switches in all the pixel sensors of the row). This activation of row select switches allows the follower-type amplifier 16 to drive the column line 26 with a column signal. Column line 26 then leads down to more circuitry that will typically amplify and store the column signal, and then convert the column signal into a digital form for inclusion in a digital pixel stream.

Having described an individual conventional active pixel sensor 10, another example of an individual active pixel sensor 30 is described with reference to FIG. 1B. The active pixel sensor 30 provides for storage of the pixel signal within the pixel sensor and is thus referred to as a storage pixel sensor 30, while the pixel sensor 10 in FIG. 1A is referred to as a non-storage pixel sensor. Storage pixel sensor 30 comprises a photodiode 32 having its anode connected to a fixed voltage potential 14 (shown in FIG. 1B as ground). The cathode of photodiode 32 is connectable to a storage capacitor 36 via a transfer switch 38. Storage capacitor 36 has a first plate connected to transfer switch 38 and a second plate connected to a fixed voltage potential 14 (shown as ground in FIG. 1B). The cathode of photodiode 32 is also connectable to a reference potential Vref 40 via a photosensor reset switch 42 so that photodiode 32 is reverse biased. A follower-type amplifier 44 has its input connected to storage capacitor 36. The output of the follower-type amplifier 44 is attached to a row select switch 46, which is connected to a row select line 48 and column line 50.

The pixel sensor depicted in FIG. 1B is operated as follows. First, the pixel sensor 30 is reset by turning on both photosensor reset switch 42 and transfer switch 38. Then the photosensor reset switch 42 is turned off so that integration of photocurrent from photodiode 32 can begin. Since transfer switch 38 is turned on, the capacitance of the storage capacitor 36 adds to the capacitance of the photodiode 32 during integration, thereby increasing the charge capacity and therefore intensity range of the storage-pixel sensor. When the integration is complete (determined by exposure control circuitry, not shown), the transfer switch 38 is turned off, isolating the voltage level corresponding to the integrated photocharge on the storage capacitor 36. Shortly thereafter, the photodiode 32 itself is reset to the reference voltage 40 by again turning on photosensor reset switch 42. This action will prevent the photodiode 32 from continuing to integrate during the readout process and possibly overflowing excess charge into the substrate which could affect the integrity of the signal on the storage element.

After the photosensor reset switch 42 is turned back on, the readout process can begin. At the appropriate time, voltage on the row select line is raised, which activates the row select switches 46 in each pixel sensor 30 in the row. This activation allows the current from the follower-type amplifier 44 to travel to column line 50. Column line 50 is coupled to more circuitry that will typically amplify the signal, and then convert the signal into digital form for inclusion in a digital pixel stream.

It is noted that FIGS. 1A and 1B each illustrate but one configuration of active pixel sensor. In general, an active pixel sensor includes a photosensor, that generates a sensor signal, and follower-type amplifier to buffer the sensor signal from the photosensor onto a bus.

FIG. 1C illustrates circuitry 60 to control the column line (reference numeral 26 in FIG. 1A, and reference numeral 50 in FIG. 1B). The column line 26, 50 is connected to a fixed voltage potential 34 (shown as ground in FIG. 1C) via a column reset switch 62. The column line 26, 50 is also connected to a common line 66 via a column select switch 64. The signal on the common line 66 is driven to an output by an amplifier 68.

In operation, the column line 26, 50 is reset by turning on the reset switch 62. (Alternately, by applying a bias voltage Vbias, the column line 26, 50 is in a reset state when it is not being driven by any output amplifiers 22, 46 of the pixel sensors 10, 30.) When the column select switch 64 is turned on (in response to a column select signal on the column select line 86), the column line signal—driven by the active pixel sensors 10, 30 connected to active row select lines 24, 48—is provided to the common line 66.

FIG. 2A is a block diagram depicting an example of an image sensor in the form of an array of active pixel sensors and surrounding architecture. From the high level as illustrated in FIG. 2A, the surrounding architecture is conventional, except for the "Row Aggregation Control" signal 76 and "Column Aggregation Control" signal 82, which are described in detail later with reference to FIGS. 4 through 9. Particular embodiments of the row decoder 71 and column decoder 84 in accordance with the invention are also described in detail later with reference to FIGS. 4 through 9.

Individual active pixel sensors (such as the active pixel sensor shown in FIGS. 1A and 1B) are organized in a pixel sensor array 70. Each row of active pixel sensors is connected to a common row select line (e.g., the row select line 24 or 48 in FIGS. 1A and 1B, respectively), the level of which is controlled by a row decoder 71 based on a row address signal 72 from a row address generator 74 (and, as described later, on the row aggregation control signal 76). Possible configurations of the row address generator 74 and the column address generator 90 are described in U.S. patent application Ser. No. 09/120,491 (filed on Jul. 21, 1998, which is incorporated herein by reference in its entirety). In particular, the row decoder 71 receives a row select pulse and activates the row select lines 24, 48 (corresponding to the row select line in FIGS. 1A and 1B) indicated by the row address signal 72. (As described later, the row decoder 71 in accordance with the invention may substantially simultaneously activate multiple row select lines, based on the row aggregation control signal 76).

The output of the active pixel sensors in the activated row(s) travels down column lines 26, 50 (corresponding to the column line in FIG. 1A and FIG. 1B, respectively) to column multiplexing circuit 78. Examples of the column multiplexing circuit 78 are illustrated in FIGS. 3A and 3B, discussed next. Basically, the column multiplexing circuit 78 multiplexes the column outputs, selecting one column at a time as indicated by the column select signals 86, generated by the column decoder 84 based on the column address signal 88. This sequential selection results in a stream of signals on the common line 66 (FIG. 1C) and at the output 92 (typically to be converted to a digital signal by an analog-to-digital converter). (As described later, the column decoder 84 in accordance with the invention may substantially simultaneously select multiple columns, based on the column address signal 88 and the column aggregation control signal 82.)

In some embodiments, the pixel sensor array 70 is linear (i.e., has only one column), in which case the column address generator 90, column decoder 84 and column multiplexing circuit 78 are not needed, and the single column line 26,50 may be coupled directly to the output 92.

From the preceding description, it can be seen that "row" and "column" may be utilized as generic terms to reflect how sensor output signals are received from the active pixel sensors, as opposed to denoting a particular physical positional relationship to an image being sensed.

Figure 2B:
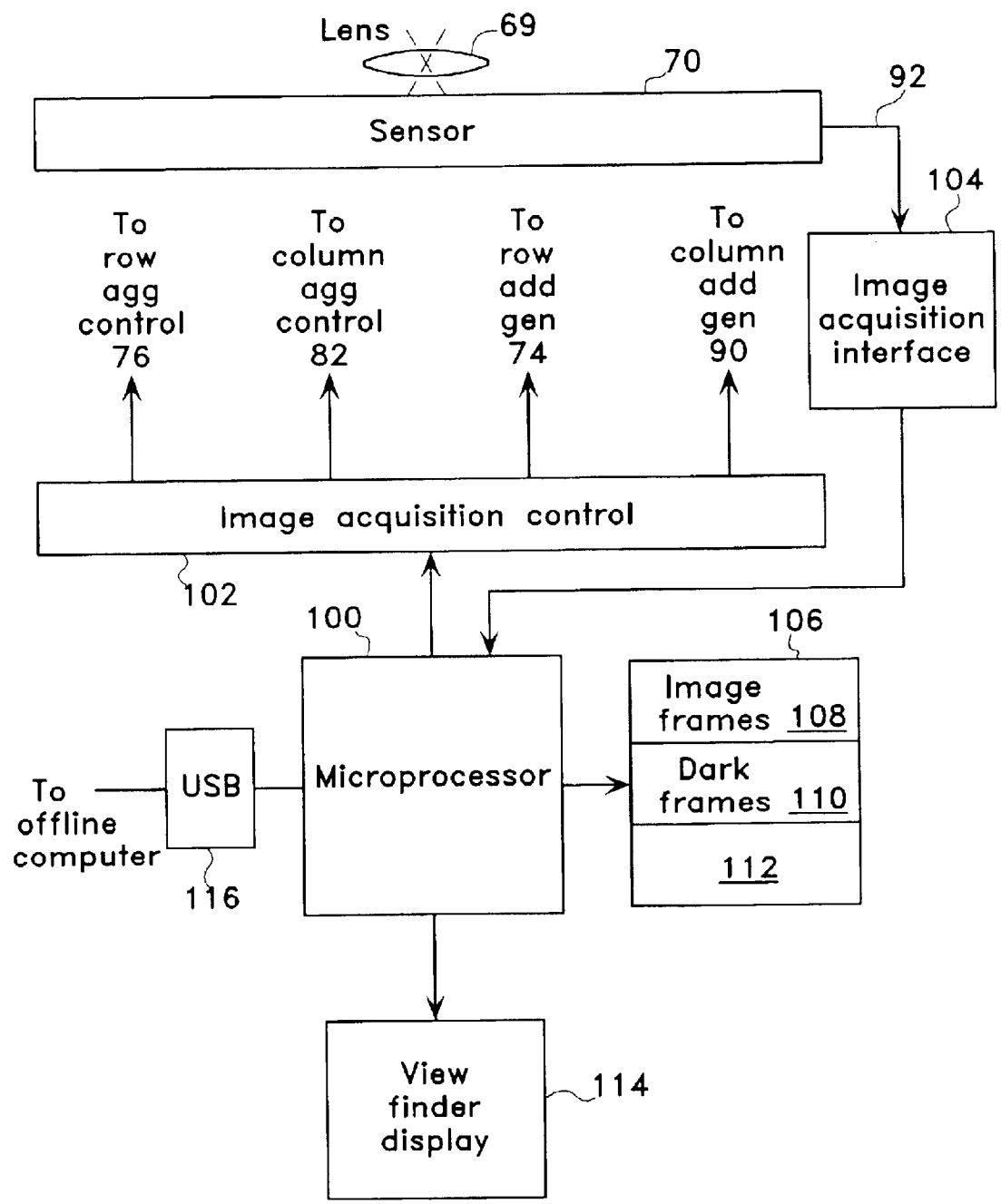
FIG. 2B is a block diagram illustrating circuitry of a digital camera and how the circuitry interfaces to the FIG. 2A image sensor and surrounding architecture.

Before examining details of the architecture surrounding the pixel sensor array 70 in FIG. 2A, it is instructive to consider how the pixel sensor array 70 and surrounding architecture illustrated in FIG. 2A interfaces to other elements of an image acquisition device such as a digital camera. FIG. 2B is a block diagram illustrating some other elements of the image acquisition device. A lens 69 focuses light onto the pixel sensor array 70. A microprocessor 100 executes a program to control the image acquisition via an image acquisition control interface 102. (Other control circuitry may be used in place of, or in addition to, the programmable microprocessor 100.) In particular, via the image acquisition control interface 102, the microprocessor 100 controls the row aggregation control signal 76, the column aggregation control signal 82, the row address generator 74 and the column address generator 90. In addition, via an image acquisition interface 104, the image data from the pixel sensor array 70 is stored into an image frame portion 108 of a memory 106. In addition, "dark frames" (described later) are stored in a dark frame portion of the memory 106. The memory 106 also includes a "working memory" portion 112. The memory 106 may also include a non-volatile store, preferably removable. The microprocessor 100 also controls display (typically of reduced resolution images) on a viewfinder display 114. Finally, an interface to an offline computer is provided via a USB interface 116 (or other type of interface).

Turning now to the details of the pixel sensor array 70 and surrounding architecture (FIG. 2A), two embodiments of the column multiplexor circuit 78 are described with reference to FIG. 3A and FIG. 3B. FIG. 3A is a block diagram depicting an example of a conventional layout of the column multiplexor circuit 78. Each column line 120 (the column lines 26, 50 in FIG. 2A) is coupled to a column node 121 via a column amplifier 122. The column node 121 is then coupled to a column select multiplexor 124. The multiplexor 124 receives the select signals 86 that selects which column signal should currently be sent to output 92. A signal representative of the voltage on the selected column line 120 (which, as the result of the row decoding, is representative of the output of one or more particular active pixel sensors in the array 70 of active pixel sensors of FIG. 2A) is then provided to output 92. (In the case where multiple column select lines 86 are asserted substantially simultaneously, the signal at output 92 is representative in some collective fashion, discussed later, of the voltages on the multiple selected column lines 120.)

FIG. 3B is a block diagram depicting an example of another conventional layout of the column multiplexor circuit 78. Rather than describe all of the details of FIG. 3B, it is sufficient to say that the FIG. 3B layout is identical to the FIG. 3A layout, except that the column signals 120 coupled to the column select multiplexor 124 via column nodes 121 are not amplified by amplifiers 122. Rather, the output of the column select multiplexor 124 is amplified by output amplifier 126 before being provided to the output 92. This circuit of FIG. 3B corresponds to the FIG. 1C circuit. That is, the line output from the column selector multiplexor 124 into the amplifier 126 in FIG. 3B corresponds to the common line 66 in FIG. 1C, and the amplifier 126 in FIG. 3B corresponds to the amplifier 68 in FIG. 1C.

As can be seen from the descriptions of FIGS. 2A, 3A and 3B, which pixel sensors of the array 70 of active pixel sensors are sampled, and when, is a result of addressing the rows and columns based on the output of the row address generator 74 and the column address generator 90. In addition, in accordance with the embodiments of FIGS. 4 through 9, which pixel sensors of the array 70 of active pixel sensors are sampled, and when, is further based on the row aggregation control signal 76 and the column aggregation control signal 82. That is, in accordance with an embodiment of the invention, aggregating outputs of active pixel sensors of an array of active pixel sensors (such as the active pixel sensors of the pixel array 70 of the imager in FIG. 2A) is accomplished by utilizing row select signal generating circuitry that is configurable to drive plural row select lines substantially simultaneously and/or column select signal generating circuitry that is configurable to select the outputs of plural column lines substantially simultaneously, thus combining the signals from plural active pixel sensors into a single aggregated signal representative of a single virtual "superpixel".

Driving a column line with substantially simultaneously selected plural active pixel sensors (e.g., active pixel sensors with source-follower amplifier outputs) is a non-linear operation. Sampling plural column lines substantially simultaneously may also be a non-linear operation. The non-linear effect has the benefit of suppressing the contribution to the superpixel signal by "hot" constituent pixels. That is, the "hot" pixels are given less weight in the superpixel signal. Furthermore, it is expected that aggregating active pixel sensor signals in this manner not only reduces noise contributions of individual active pixel sensors but, also, reduces the well-known aliasing effect. These benefits are described in greater detail later, after a description of six different embodiments (FIGS. 4 through 9) in accordance with the invention of select signal generating logic that may be employed to accomplish aggregation of active pixel sensor signals. Each of FIGS. 4 through 9 illustrates logic that, by itself, may be employed to effect aggregation in one dimension—either row or column. Typically, selection in each dimension—row and column—is orthogonal; that is, separate selection logic is used in each dimension and the selection in one dimension does not affect the decoding or selection in the other dimension.

Figure 4:
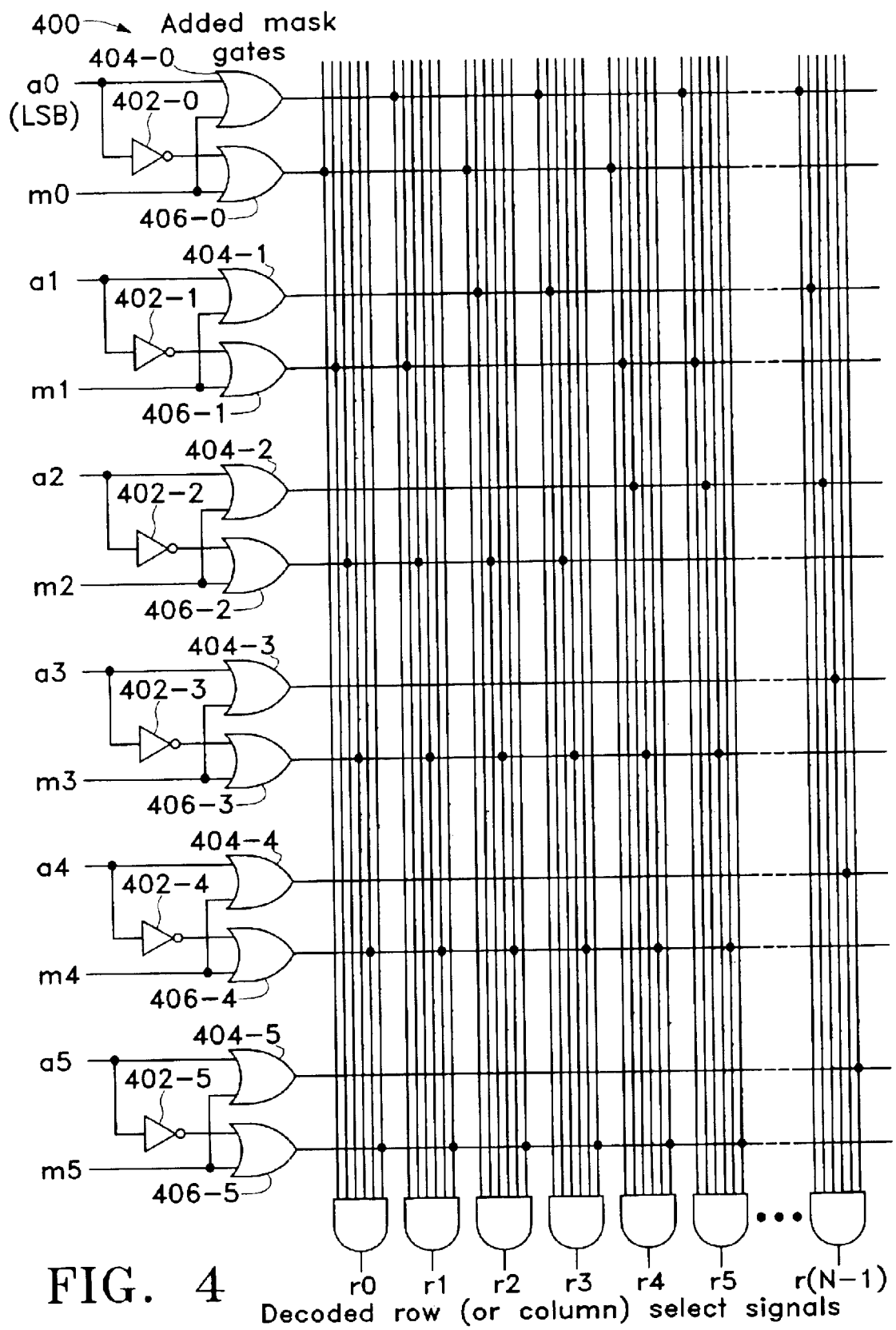
FIG. 4 is a circuit diagram illustrating a first embodiment of select logic to select particular active pixel sensors of an array of active pixel sensors such that the outputs of the selected active pixel sensors are aggregated.

FIG. 4 illustrates a first example select signal generation embodiment 400. The selection signal generation logic 400 is an enhancement of conventional logic-gate-based decoder logic. An example of such enhanced logic-gate-based decoder logic is disclosed in U.S. Pat. No. 5,262,871 to Wilder et al. Specifically, Wilder's FIGS. 3A, 3B and 4 collectively illustrate a decoder circuit that employs logic gates in a configuration similar to the configuration of the logic gates 404-0 through 404-5 and 406-0 through 406-5 in FIG. 4 of the instant patent application. In particular, Wilder employs address signals and their corresponding complements, as modified by address bit masking logic, to control (via a "combinatorial decoder" section and a "binary decoder" section) which pixel sensors of an array of passive pixel sensors are to contribute to a "superpixel" output signal. Notably, Wilder et al. does not disclose that the pixel sensors are active pixel sensors. (For convenience, in the remainder of this description, the terms "pixel" and "pixel sensor" are used interchangeably.)

Turning to FIG. 4, it can be seen that the select signal generation circuitry 400 includes "mask gates" 404-0 through 404-5 and 406-0 through 406-5 that, based on the state of mask bits m0 through m5 (set, for example, by a microprocessor under software or firmware control), conditionally force both the true and complement of a particular address bit signal to the same level. For example, if mask bit m0 is set, then the outputs of mask gates 404-0 and 406-0 are both set regardless of the state of address bit a0. In general, if mask bit m"n" (where "n" is an integer) is set, then the outputs of mask gates 404-n and 406-n are set.

As a result, aggregation may be achieved in groups of two pixels, four pixels or any other number of pixels that is a power of two. For example, assuming that the FIG. 4 selector logic 400 is for providing row select signals and mask bit m0 is set and the other mask bits (m1 through m5) are clear, row select signals r0 and r1 will be set when address bits a1 through a5 are clear, regardless of the value of address bit a0. That is, address bit a0 essentially becomes a "don't care" as the mask bit m0 being set forces the outputs of mask gates 404-0 and 406-0 to both be set. In each particular implementation, the mask gates 404 and 406 may be provided corresponding only to those address bits for which it is desired to accomplish aggregation capability.

In use, the mask bits (m0 through m5) are set to correspond to the desired superpixel size in one dimension, and the address is incremented in that dimension (e.g., by the row address generator 74 or the column address generator 90 of FIG. 2A) by an amount equal to the superpixel size (based on the row aggregation control signal 76 or column aggregation control signal 82, as appropriate). For example, to accomplish a superpixel size of four pixels, mask bits m0 and m1 are set, and the address is incremented by four. As a result, the select signals are such that superpixels of four pixels are selected (row or column, depending whether the select signals are row select signals or column select signals, respectively).

Figure 5:
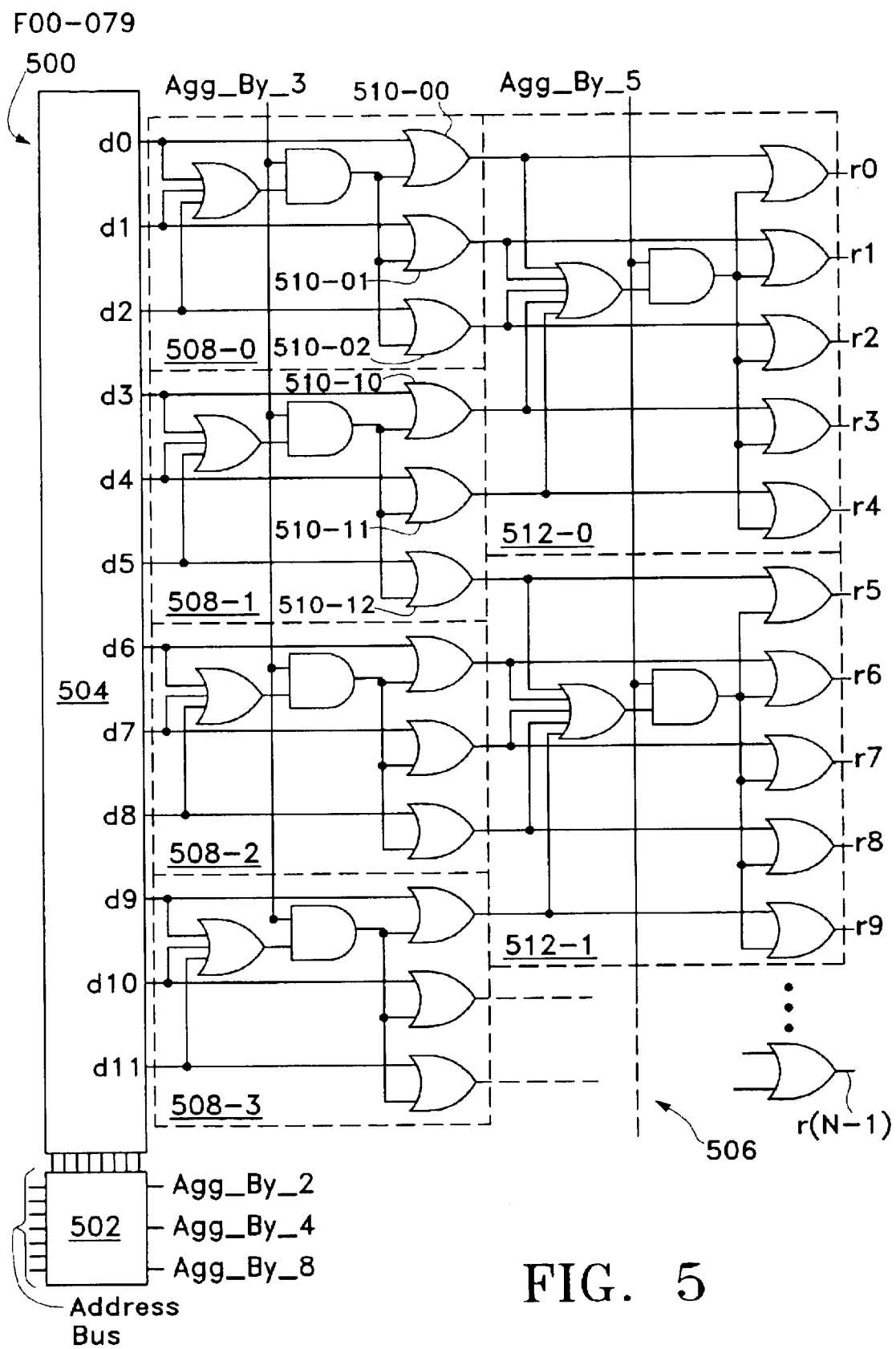
FIG. 5 is a circuit diagram illustrating a second embodiment of select logic to select particular active pixel sensors of an array of active pixel sensors such that the outputs of the selected active pixel sensors are aggregated.

FIG. 5 illustrates a second example embodiment 500 of select signal generation logic. The block 502 is initially disregarded for purposes of this description, but is discussed later after the remaining blocks of FIG. 5 are described. The array 504 may be a "standard" decoder array such as is conventionally employed. Following the array 504, logic blocks 508-0 through 508-3 are provided to conditionally (based on the state of the Agg_By_3 aggregation control signal) set three outputs when any of the inputs are set. Using block 508-0 as an example, when the Agg_By_3 signal is set, all of the outputs 510-00, 510-01 and 510-02 are set when any of the inputs d0, d1 and d2 are set. Similarly, for logic block 508-1, all of the outputs 510-10, 510-11 and 510-12 are set when the Agg_By_3 signal is set and any of the inputs d3, d4 and d5 are set. As a result, superpixels of three pixels are accomplished.

Still referring to FIG. 5, logic blocks 512-0 and 512-1 are concatenated to the logic blocks 508-0 through 508-3 to accomplish superpixels of five pixels. That is, the outputs r0 through r5 are set when the Agg_By_5 signal is set and any of the inputs d0 through d4 are set. Similarly, the outputs r5 through r9 are set when the Agg_By_5 signal is set and any of the inputs d5 through d9 are set. While circuitry to accomplish blocks of three pixels (using logic blocks 508-0 through 508-2) and five pixels (using logic blocks 512-0 and 512-1) is described, similar circuitry to accomplish blocks of other sizes may be employed. Significantly, superpixel sizes other than powers of two may be accomplished using the FIG. 5 approach.

In addition, referring now to logic block 502 which was initially disregarded, the block 502 may be circuitry such as the masking circuits of FIG. 4 that converts a standard decoder 504 to a decoder 400 with power-of-2 superpixel selection. Furthermore, by, for example, selecting superpixels of two pixels that straddle two pixel blocks of three or five, superpixels of six and ten pixels are accomplished. Similarly, other combinations may be employed to accomplish superpixels of other sizes.

Figure 6:
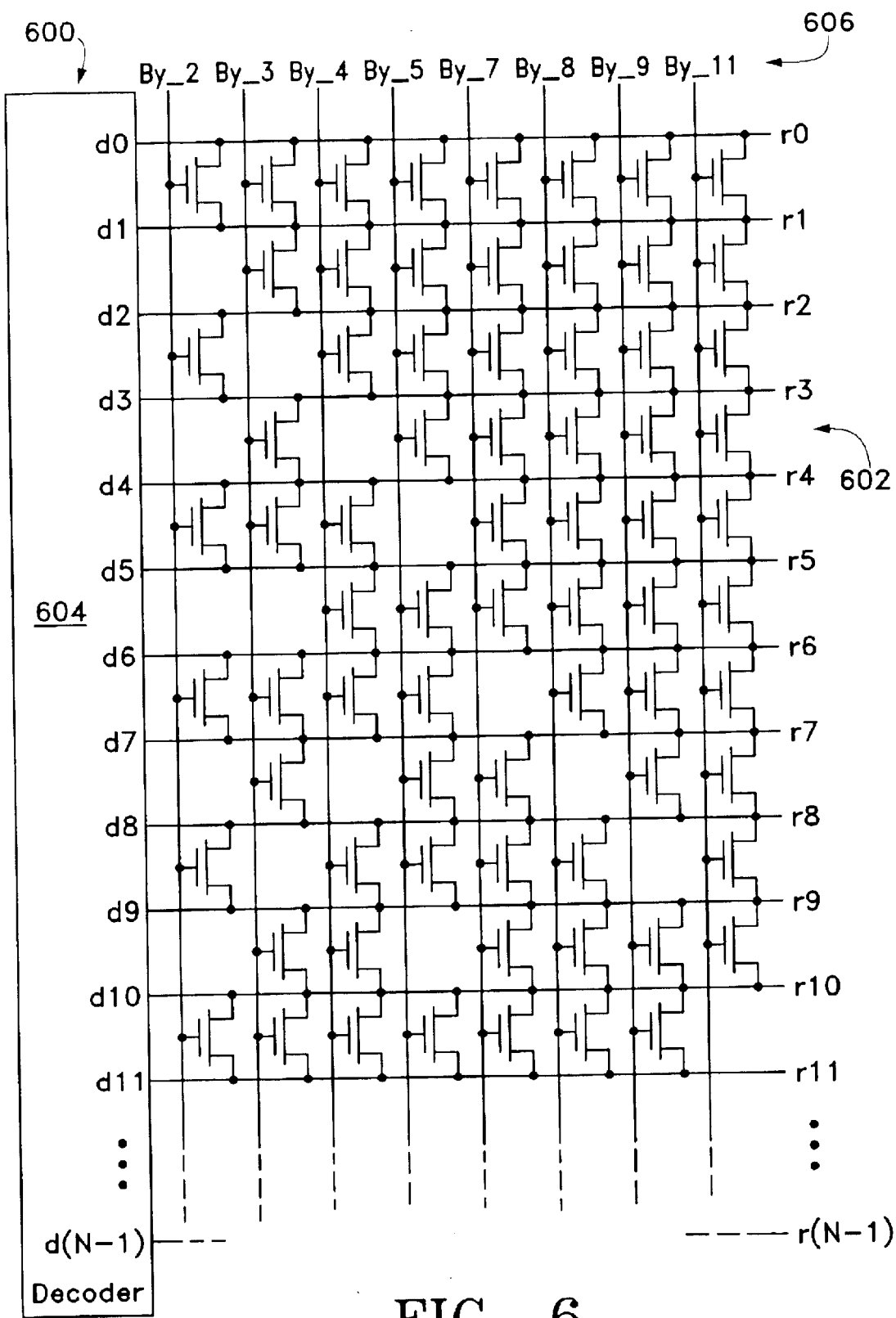
FIG. 6 is a circuit diagram illustrating a third embodiment of select logic to select particular active pixel sensors of an array of active pixel sensors such that the outputs of the selected active pixel sensors are aggregated.

FIG. 6 illustrates a third example embodiment 600 that includes a network 602 of switch circuitry appended to a "standard" decoder 604. (By "standard", it is meant that only one of the decoder outputs d0 through d(N−1) is active at any one time.) By setting a particular aggregation selection of input 606 (i.e., setting one of By__2, By__3, By__4, By__5, By__7, By__8, By__9 and By__11 high—generically "By__ n"), the appropriate decoder outputs d0 through d(N−1) of the decoder 604 are shorted together to set the appropriate select signals of r0 through r(N−1)—corresponding to N rows or N columns of an array of active pixel sensors—to accomplish the corresponding superpixel size. In the FIG. 6 embodiment, it is preferred that the decoder outputs d0 through d(N−1), when driven, are driven hard in the direction of the active state and are dynamically reset or have a weak load toward the inactive state. As discussed above with respect to the FIG. 5 embodiment, the FIG. 6 switch circuitry network 602 and decoder 604 may be appended to a circuit such as the FIG. 4 circuit 400 to accomplish superpixels having various numbers of pixels other than those specifically provided for by the By__n selection inputs 606.

Figure 7:
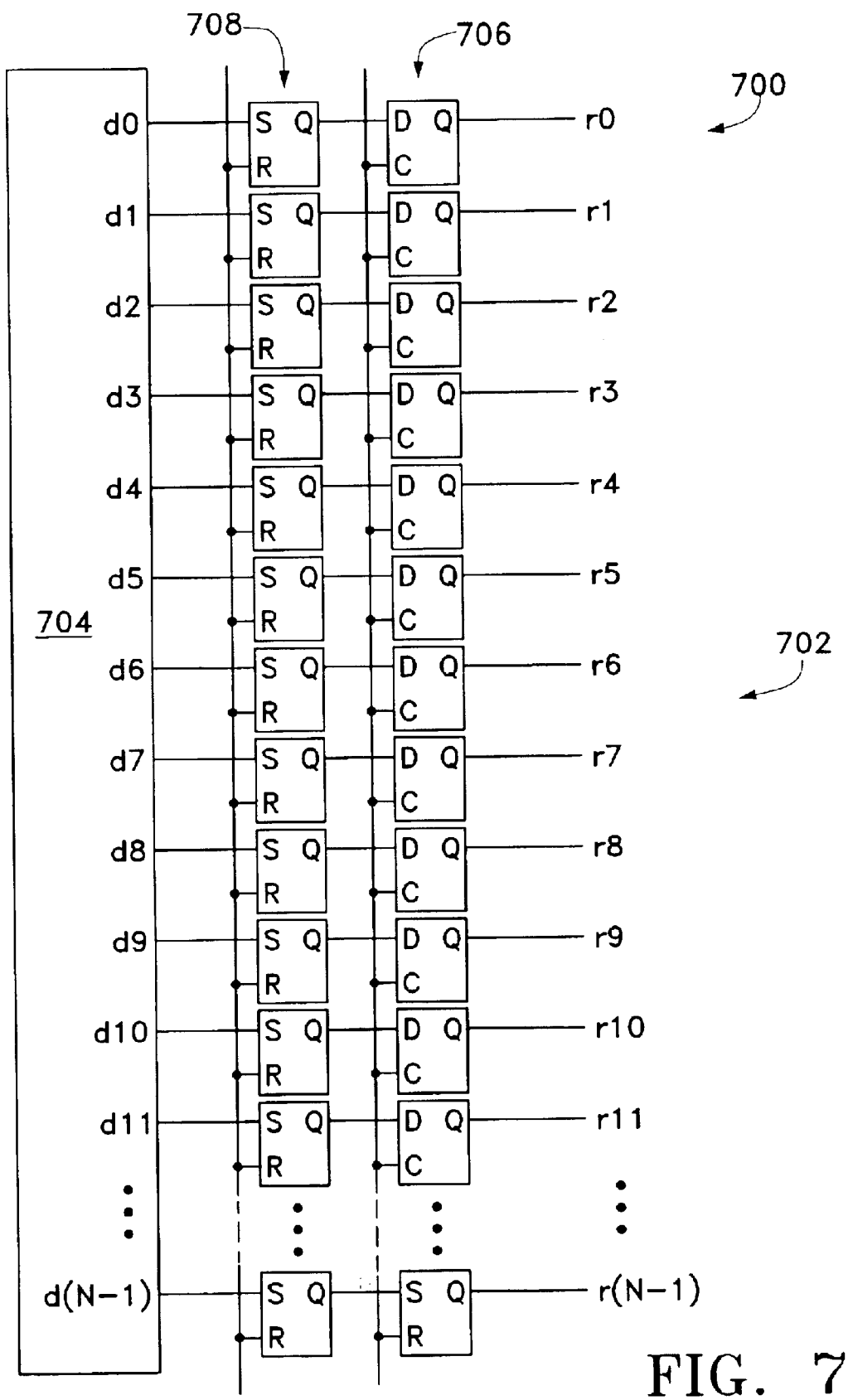
FIG. 7 is a circuit diagram illustrating a fourth embodiment of select logic to select particular active pixel sensors of an array of active pixel sensors such that the outputs of the selected active pixel sensors are aggregated.

FIG. 7 illustrates a fourth example embodiment 700 that includes a network 702 of latches 706 and 708 between the decoder 704 (which may be, for example, a "standard" decoder) and the select signals r0 through r(N−1). The select signals r0 through r(N−1) are set for superpixels of n pixels by sequentially counting (preferably, rapidly) the decoder 704 through n addresses, causing the associated decoder 704 outputs to become active. When the selector signals r0 through r(N−1) are row select signals, there is typically ample time to set the n selector outputs by counting as just described. When the select signals r0 through (N−1) are column select signals, however, for superpixels of n pixels, n decode cycles would be required to accomplish each n pixel superpixel. The line of latches 708 can be set up while the previous values are being output from the latches 706, which makes such an arrangement more feasible from a timing point of view.

Figure 8:
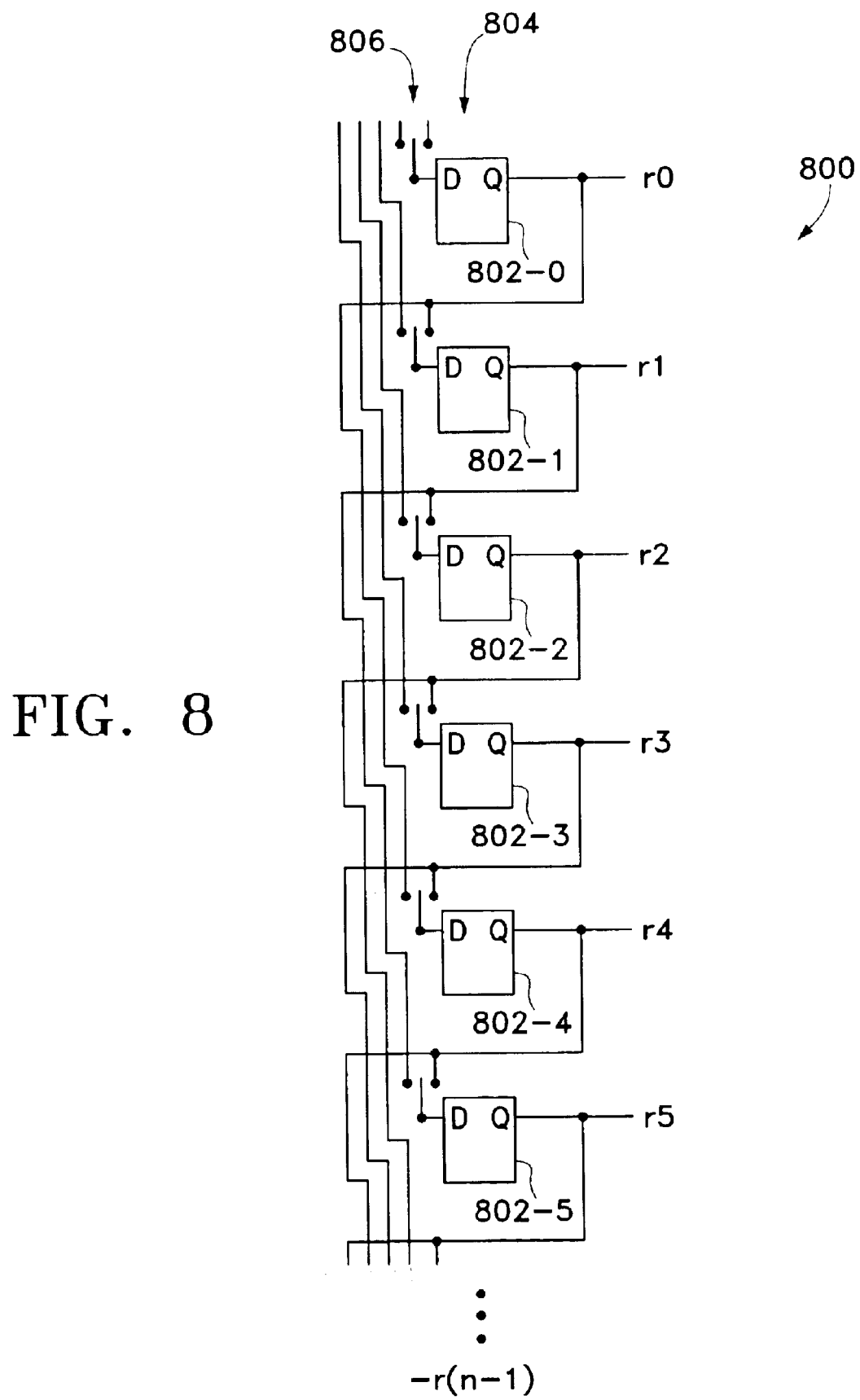
FIG. 8 is a circuit diagram illustrating a fifth embodiment of select logic to select particular active pixel sensors of an array of active pixel sensors such that the outputs of the selected active pixel sensors are aggregated.

FIG. 8 illustrates a fifth example embodiment 800 which includes a shift register 804. In operation, to accomplish superpixels of n pixels, n set bits are shifted into the bits 802 (in FIG. 8, bits 802-0 through 802-5 are explicitly shown) of the shift register 804. To select each succeeding superpixel block, the shift register 802 is clocked n times. In accordance with an enhanced embodiment, a set of selectable (by switches 806) fixed datapaths are provided to allow for a shift-by-K, where K is typically two, three or four. For example, with a combination of shift-by-one and shift-by-four as illustrated in FIG. 8, the bits in the register can be shifted by one to fourteen places in five clock cycles. Additional control logic may be provided, including auxiliary counters to track the shifting progress, to set up starting locations, to provide the n input set bits, to cause the shifting by n, and other control functionality. Such control logic may be in the form of a microprocessor under software or firmware control.

Figure 9:
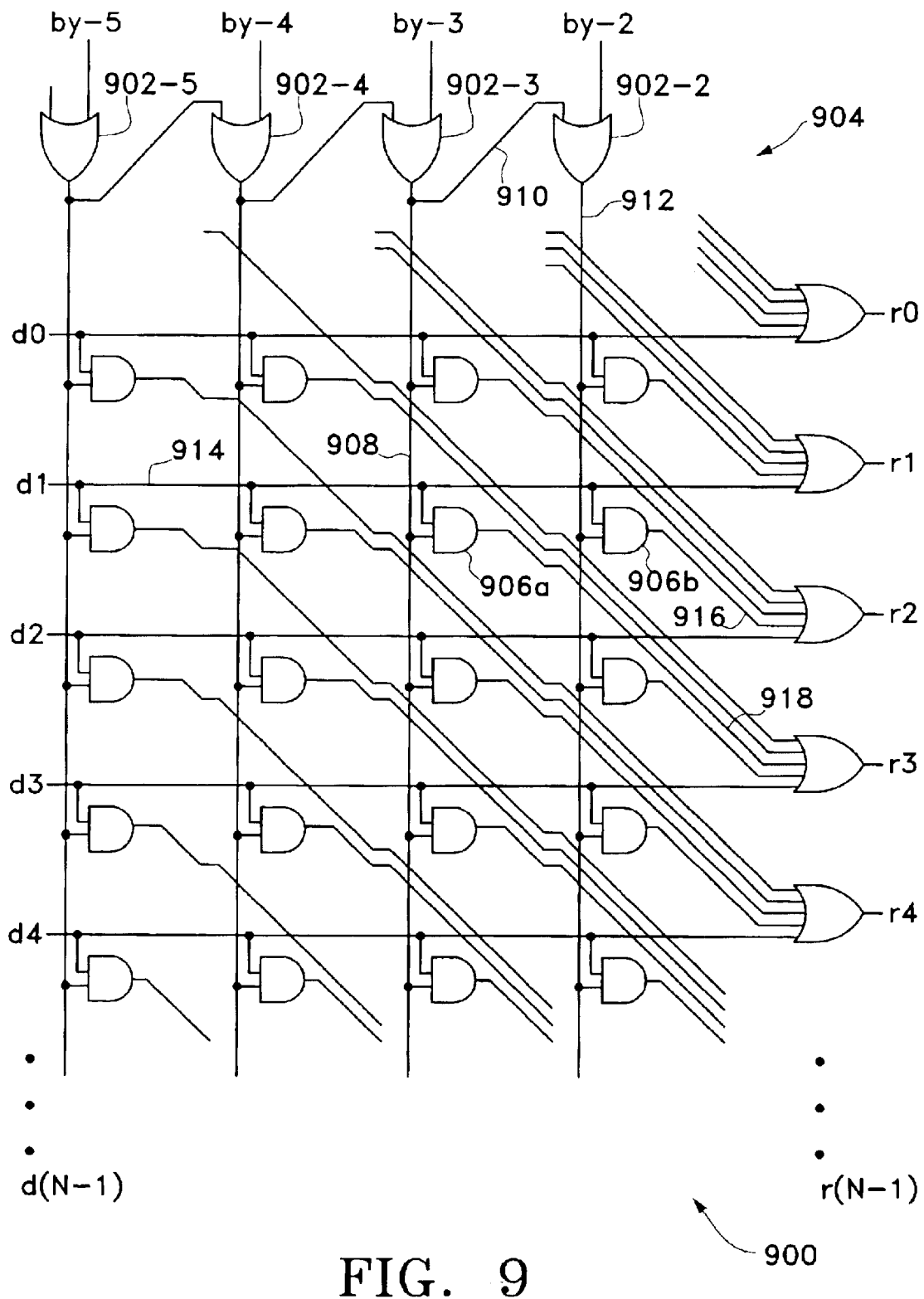
FIG. 9 is a circuit diagram illustrating a sixth embodiment of select logic to select particular active pixel sensors of an array of active pixel sensors such that the outputs of the selected active pixel sensors are aggregated.
Figure 1A:
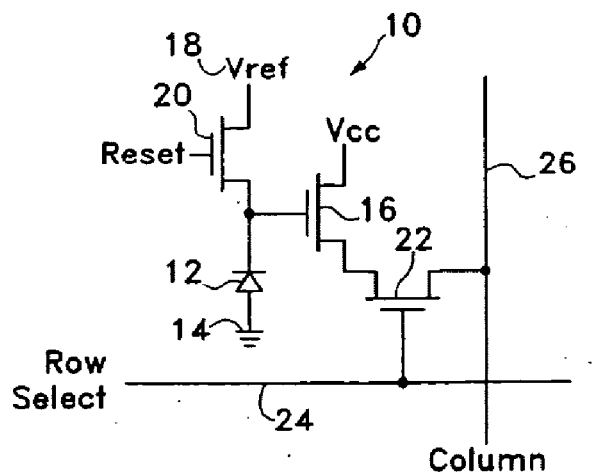
Figure 1B:
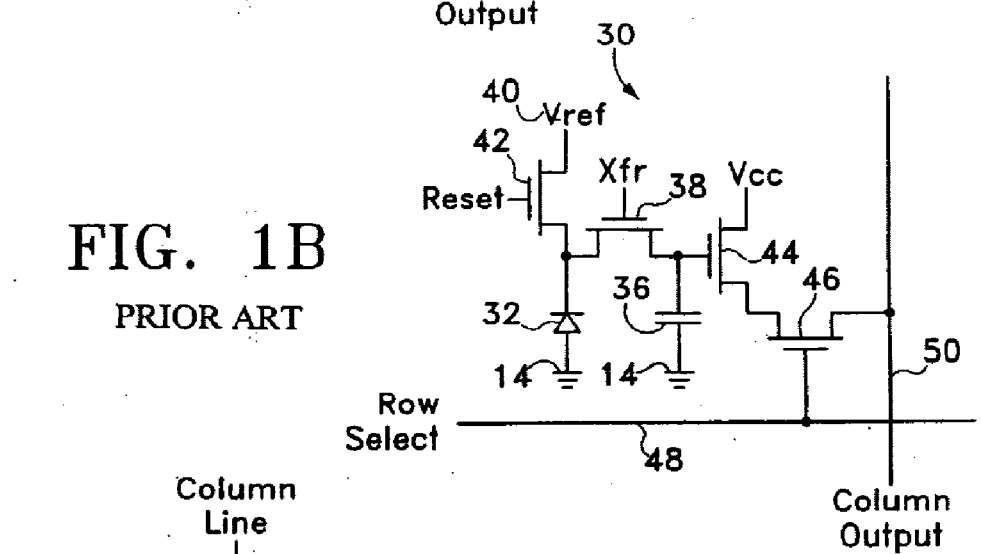
Figure 1C:
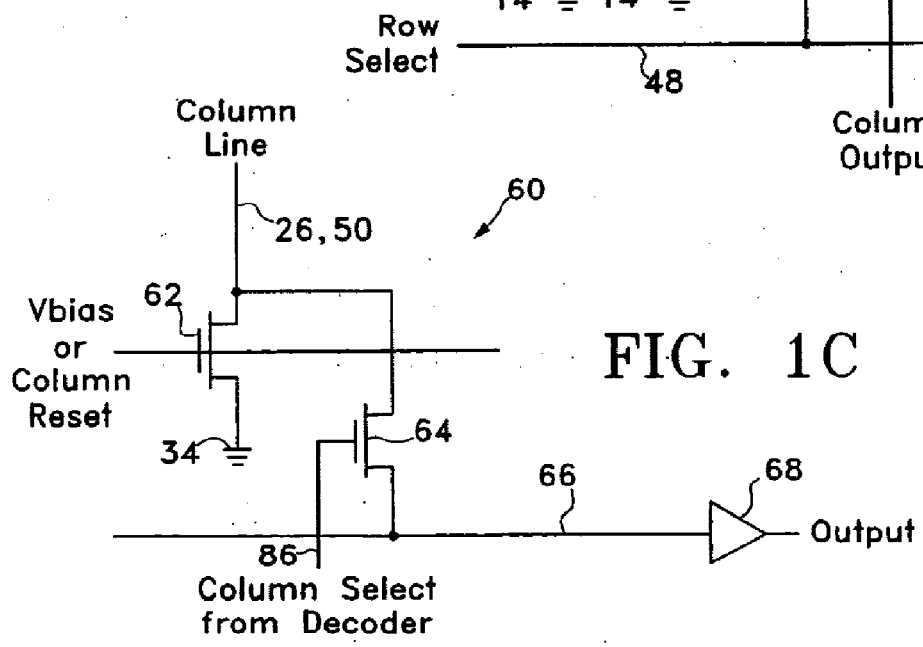

FIG. 9 illustrates yet another example embodiment 900. With the embodiment 900, as with the embodiments 700 (FIG. 7) and 800 (FIG. 8), pixels of a superpixel can be arbitrarily aligned row-wise and column-wise within the array of pixels. With the embodiment 900, however, such arbitrary alignment may be achieved more quickly than with the embodiments 700 and 800. In FIG. 9, the inputs d0, d1, . . . , d(N−1) are decoded address outputs of a standard decoder array such as is conventionally employed. The outputs r0, r1, . . . , r(N−1) are row or column select signals. Based on the by-2, by-3, by-4 and by-5 signals input into OR logic 902-2, 902-3, 902-4 and 902-5, respectively, the convolutionally-connected AND-OR logic network 904 of the embodiment 900 accomplishes a logical convolution operation of the decoder output d0, d1, . . . , d(N−1) with a bit pattern of n consecutive set bits, such that the select signals r0, r1, . . . , r(N−1) accomplish superpixels of n pixels.

For example, if the by-3 input is asserted, then the output of the OR logic 902-3 is asserted (as indicated by the bold line 908) and the output of the OR logic 902-2 is also asserted as indicated by the bold lines 910 and 912. If the decoder output d1 is asserted, then the select signal r1 is asserted (as indicated by the bold line 914). In addition, because both the output of the OR gate 902-2 is asserted (bold line 912) and the decoder output d1 is asserted (bold line 914), the output of AND gate 906b is also asserted (as indicated by bold line 916), which causes the selection output r2 to be asserted. Finally, because the output of the OR gate 902-3 is asserted (bold line 908) and the decoder output d1 is asserted (bold line 914), the output of the AND gate 906a is asserted (as indicated by bold line 918), which causes the selection output r3 to be asserted.

Six distinct embodiments of select signal generation for accomplishing superpixels have been illustrated in FIGS. 4 through 9 and described above. In addition, it has also been described how the embodiments or elements of the various embodiments may be combined. It is further noted that each of these embodiments can accomplish row selection or column selection. Given that column access timing requirements are usually more stringent than row access timing requirements, it is useful in many instances to utilize one embodiment (which, as just discussed, may actually be a combination of the illustrated embodiments) for column selection and another embodiment (which also may actually be a combination of the illustrated embodiments) for row selection. For example, the embodiment utilized for column selection may be a relatively faster embodiment, but have relatively more complex circuitry, while the embodiment utilized for row selection may be a relatively slower embodiment and have relatively simpler circuitry.

The operation of the active pixel sensors themselves during an aggregation operation (i.e., when plural rows or columns are selected) is now described. As discussed at the beginning of this Detailed Description (using the FIG. 1A "non-storage" pixel embodiment for illustration), for the CMOS active pixel sensor 10, a voltage on the photodiode 12 is precharged to a reset potential, and the voltage on the photodiode 12 decreases as light or leakage discharges the photodiode. The voltage signal at the input of the follower-type amplifier 16 (e.g., at the gate of a source-follower amplifier) is read via the source follower amplifier 16 onto the column line 26 when the row select line 24 is active (actuating the row select switch 22).

When several rows are selected at once, the parallel follower-type amplifiers 16 (of the pixel sensors 10 of the selected rows) connected to a particular column line 26 will drive that column line higher than it would be driven as a result of any of the selected rows being individually selected, to a voltage that will tend to be more indicative of the higher input voltages and less indicative of the lower input voltages. Put another way, if the follower-type amplifier input voltages for n selected rows of a particular column line 26 are close in value to each other, then the resulting voltage on the column line 26 will be close to an average of the n values of those follower-type amplifier input voltages in the sense that the output change in response to any one small follower-type amplifier input voltage will be a gain near 1/n. On the other hand, if some of the follower-type amplifier input voltages for a particular column line 26 are much higher in value than the other follower-type amplifier input voltages generally, the resulting voltage on the column line 26 will tend toward the highest of the follower-type amplifier input voltages. This function is known in the art of analog processing as a "softmax" since the output change in response to higher values of follower-type amplifier input voltage will be greater, and lower values of follower-type amplifier input voltage will have relatively little influence or gain.

In accordance with some embodiments, a dark subtraction is performed to compensate for leakage and offsets in the pixel sensors. Typically, a dark subtraction value is determined by driving each pixel sensor individually—in the dark—and measuring the resulting voltage for that pixel sensor. Then, in use, the dark subtraction value determined for each pixel sensor is subtracted from the voltage value measured for that pixel.

When pixels are being aggregated, however, the amount by which to compensate depends on the number n of pixels being aggregated. Thus, in accordance with an embodiment of the invention, for each value of n (or more specifically, for each aggregation/sampling pattern), a dark frame is grabbed with the same aggregation/sampling pattern. It is from this dark frame that the value is determined for subtracting at each superpixel location. Alternatively, an average dark level value to subtract may be estimated, but this average dark level value preferably depends on at least the value of n so, in practice, one of the above-described dark frames may be averaged for the sampling pattern of interest.

In a camera with a mechanical shutter, the dark frame may be grabbed with an exposure duration comparable to the real exposure, but with the shutter closed. If there is no shutter, an "electronic dark frame" may be grabbed with zero integration time while the imager has light falling on it. Preferably, a new dark frame is grabbed whenever the aggregation pattern is changed.

A higher level of voltage signal output from a particular follower-type amplifier 16 corresponds to a "darker" pixel. As a result, the "softmax" voltage operation is actually a "softmin" with respect to light intensity. Thus, this type of aggregation tends to minimize the effect of a "hot" (i.e., leaky) pixel, serving to mask this type of common defect and reduce or eliminate the need to otherwise perform hot pixel correction in reduced-resolution modes.

With respect to aliasing, if a superpixel of pixels in selected rows includes a light-to-dark edge across a column then, due to the "softmin" effect, the dark side of the image tends to dominate the aggregated output signal for the column. As a result, the apparent position of the edge may shift by a fraction of the superpixel size. While the net result is some non-linear aliasing in one dimension, the aliasing effect is generally smaller than would result from sampling only one pixel. One way to reduce this just-discussed non-linear effect is to select a number of rows for aggregation that is smaller than the address increment. For example, by selecting three rows at a time but incrementing in address by four rows, the amount of sub-pixel "spreading" of dark features is reduced. Since the embodiments of FIGS. 7 through 9 allow for an independence between the sizes and the locations of the simultaneously selected rows or columns, these embodiments allow aggregating n and incrementing by n+1, for example. The address generator (row address generator 74 or column address generator 90, as appropriate) is commanded to increment the address in a way different than indicated directly by the aggregation control signal (row aggregation control signal 76 or column aggregation control signal 82, as appropriate). This command could be accomplished via an additional signal from the microprocessor 100 to the image acquisition control interface 102 (FIG. 2B). The embodiments of FIGS. 5 and 6, on the other hand, could be modified to support a particular "hardwired" relationship between the number of rows being aggregated and the address increments to be used.

The timing implications of column selection is now specifically discussed with respect to the FIG. 3B column multiplexing circuit 78. Particular column lines 120 (denoted by reference numerals 26 and 50 in FIGS. 1A and 1B, respectively) may be selected together, while the follower-type amplifiers (denoted by reference numerals 16 and 44 in FIGS. 1A and 1B, respectively) are still driving those column lines 120. In this case, the follower-type amplifiers 16,44 of the active pixel sensors in the two dimensional superpixel determined by the selected rows and selected columns all drive in parallel to accomplish a collective "softmin" operation. An alternative is to store each column signal capacitively for each column, or otherwise buffer the column signals. In the case where the column signals are stored capacitively, the charges from multiple columns may then be combined linearly by selecting the multiple column capacitors onto a common readout line. An example of charge sharing readout is described in pending U.S. patent application Ser. No. 09/099,111 (filed on Jun. 17, 1998, which is incorporated herein by reference in its entirety).

The pixel aggregation techniques described herein are applicable to monochrome sensors and, in various ways, to color sensors. Methods of using sensor arrays to capture color images include, but are not limited to, mosaic filter arrays, three-sensor systems with color separation prisms, three-shot cameras with changeable filters, full-measured-color arrays with vertical silicon filtering and three active pixel sensor circuits at each array location, and tri-linear scanning systems. For such color capture methods, pixel aggregation can be accomplished as described herein.

In one embodiment, a full-measured-color array, as disclosed in U.S. Pat. No. 5,965,875 or in co-pending U.S. patent application Ser. No. 09/884,863 (filed on Jun. 18, 2001, which is incorporated herein by reference in its entirety) is used, with separate active pixel sensors, column lines, and column multiplexing circuits for each of three color layers. One set of row select signal generation circuitry, as described above, is applied to control the simultaneous aggregation and readout for the three color channels. In other embodiments, active pixel sensors with three sets of row select lines and one set of column lines are utilized and, in this case, three sets of row select signal generation circuitry, sharing major portions between them, can control sequential readout of the color channels. These and other applications of the techniques described herein to such full-measured-color arrangements are within the scope of the invention.

Three-sensor systems with color separation prisms use three instances of a monochrome system as herein described. Some control circuitry that is not integrated on the sensor chips may be shared to control the three active pixel sensors identically.

Three-shot cameras can simply apply the techniques described, using a broadband monochrome sensor array, three times in sequence to sense and read out three color channels.

Tri-linear scanning systems can apply one-dimensional aggregation within each of the three colors of linear active pixel sensor arrays, possibly using a single set of selection logic according to any of the described embodiments, with select lines wired across the three linear arrays. Alternately, much of the selection logic may be duplicated to avoid having selection control lines cross the active pixel sensor arrays.

Filter mosaic systems typically use the well-known Bayer pattern, wherein half the pixel sensors have green filters over them, and the other half are equally divided between blue and red. Aggregating in such systems is non-trivial, since adjacent pixel sensors sense different colors. In accordance with some embodiments of the present invention, however, multiple-row and multiple-column select signal generation logic is employed to select groups of pixels of the same color.

One important special case is a 2×2 aggregation within 4×4 blocks, so that case is now described in some detail as an example. In particular, referring now to FIG. 10A, a portion of a Bayer pattern filter mosaic on an active pixel sensor array is schematically illustrated. The filters are labeled R and B for red and blue, and Gr and Gb for the green filters on rows with red filters and on rows with blue filters, respectively. A 2×2 group of green sensors on rows 0 and 2 and columns 0 and 2 are highlighted, representative of a Gr superpixel (the Gr and Gb filters may not be identical, and hence are grouped with others of like label).

Figures 10A, 10B:
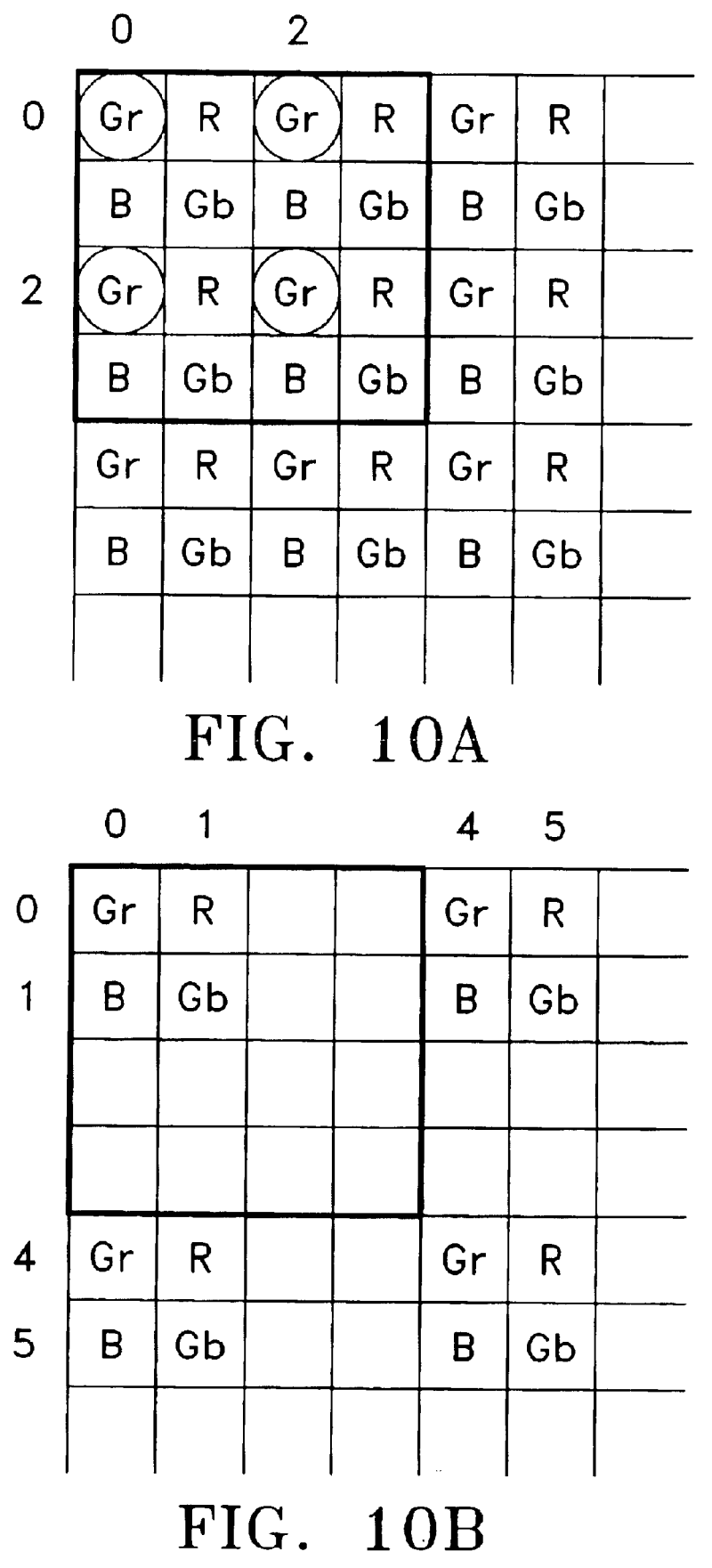

The embodiment of FIG. 4, as applied to the FIG. 10A Bayer pattern filter mosaic, is now considered. Specifically, the mask bits are set such that m0=0, m1=1, m2=0, m3=0, m4=0 and m5=0. In that case, the least significant bit of the address has significance to the generation of selection signals, selecting even or odd rows (or columns). However, the next bit becomes a "don't care" and causes aggregation of non-adjacent pairs within blocks of four. As illustrated in FIG. 10B, all colors of 2×2 superpixels can be addressed by using row addresses 0,1,4,5, etc., and column addresses 0,1,4,5, etc. The least significant bit (a0) of the row address and of the column address can be thought of as the color selection bits, while address bits a2 and higher count off rows or columns of superpixels. Four values are read within each 4×4 color superpixel. In accordance with some embodiments, a special color de-mosaicing algorithm is used to process the data that accounts for the misalignment of the samples. Similarly, there are other ways to use the embodiments illustrated herein to group similarly-colored pixels within Bayer pattern filter mosaics and within other patterns of filter mosaics.

While the description thus far with respect to active pixel sensors has been in terms of CMOS active pixel sensors having follower-type outputs, it is within the scope of at least some aspects of the invention to employ other forms of active pixel sensors, such as NMOS.

What is claimed is:

1. An image sensor, comprising:
   a plurality of active pixel sensors arranged in a plurality of rows and at least one column, each active pixel sensor including
      a photosensor configured to generate a sensor signal nominally indicative of an intensity of light incident on the photosensor;
      a follower-type amplifier configured to provide a buffered voltage sensor signal based on the sensor signal; and
      sensor output selection circuitry configured to selectively couple the buffered voltage sensor signal to an output of the active pixel sensor when the row to which the active pixel sensor belongs is selected based on one of a set of row select signals corresponding to that row;
   for each column, a column line coupling together the outputs of the active pixel sensors that belong to that column; and
   row select signal generating circuitry configured to generate the set of row select signals to substantially simultaneously select a corresponding set of plural particular rows such that each of the active pixel sensors in the selected corresponding set of plural particular rows substantially simultaneously provides the buffered voltage sensor signal for that active pixel sensor to the column line for the column to which that active pixel sensor belongs such that an output node of each column line indicates a collective output signal for the active pixel sensors in that selected corresponding set of plural particular rows, belonging to that column.

2. The image sensor of claim 1, wherein:

the follower-type amplifier includes a field-effect transistor configured as a source-follower amplifier.

3. The image sensor of claim 2, wherein:

the sensor output selection circuitry includes a field-effect transistor, wherein the gate of the sensor output selection circuitry field-effect transistor is coupled to the one of the set of row select signals; and the source-follower amplifier field-effect transistor and the sensor output selection circuitry field-effect transistor each have the same conductivity type.

4. The image sensor of claim 1, wherein:

the follower-type amplifier includes a bipolar transistor configured as an emitter-follower amplifier.

5. The image sensor of claim 1, wherein:

the row select signal generating circuitry generates the set of row select signals based on a row address signal that corresponds to a particular row and on a row aggregation control signal that corresponds to a number of rows in the selected corresponding set of plural particular rows.

6. The image sensor of claim 5, further comprising:

row address signal generating circuitry that generates the row address signal.

7. The image sensor of claim 6, wherein:

the row address signal generating circuitry generates the row address signal based, in part, on the row aggregation control signal.

8. The image sensor of claim 1, wherein:

the set of row select signals is one set of row select signals in a sequence of sets of row select signals;

the selected corresponding set of plural particular rows is one set of plural particular rows in a sequence of sets of plural particular rows; and the row select signal generating circuitry is configured to generate the sequence of sets of row select signals.

9. The image sensor of claim 8, wherein:

the row select signal generating circuitry generates the set of row select signals based on a row address signal that corresponds to a particular row;

the row address signal is one row address signal in a sequence of row address signals;

the image sensor further comprises row address signal generating circuitry that generates the sequence of row address signals, each row address signal corresponding to a particular row; and the row select signal generating circuitry generates the sequence of sets of row select signals based on the sequence of row address signals and on a row aggregation control signal that corresponds to a number of rows in each selected corresponding set of plural particular rows.

10. The image sensor of claim 9, wherein:

the row address signal generating circuitry generates each next row address signal in the sequence based, in part, on the current row address signal.

11. The image sensor of claim 9, wherein:

the row address signal generating circuitry generates each next row address signal in the sequence based on the current row address signal and on the row aggregation control signal.

12. The image sensor of claim 1, further comprising:

column select signal generating circuitry configured to generate a set of column select signals to substantially simultaneously select a corresponding set of plural particular columns such that the collective output signal for each column in the selected corresponding set of plural particular columns is substantially simultaneously provided to an output node of the image sensor.

13. The image sensor of claim 12, wherein:

the column select signal generating circuitry generates the set of column select signals based on a column address signal that corresponds to a particular column and on a column aggregation control signal that corresponds to a number of columns in the set of plural particular columns.

14. The image sensor of claim 13, further comprising:

column address signal generating circuitry that generates the column address signal.

15. The image sensor of claim 14, wherein:

the column address signal generating circuitry generates the column address signal based, in part, on the column aggregation control signal.

16. The image sensor of claim 13, wherein:

the set of column select signals is one set of column select signals in a sequence of sets of column select signals;

the set of plural particular columns is one set of plural particular columns in a sequence of sets of plural particular columns; and the column select signal generating circuitry is configured to generate the sequence of sets of column select signals.

17. The image sensor of claim 16, wherein:

the column address signal is one column address signal in a sequence of column address signals;

the image sensor further comprises column address signal generating circuitry that generates the sequence of column address signals, each column address signal corresponding to a particular column; and the column select signal generating circuitry generates the sequence of sets of column select signals based on the sequence of column address signals and on a column aggregation control signal that corresponds to a number of columns in each selected corresponding set of plural particular columns.

18. The image sensor of claim 17, wherein:

the column address signal generating circuitry generates each next column address signal in the sequence based, in part, on the current column address signal.

19. The image sensor of claim 17, wherein:

the column address signal generating circuitry generates each next column address signal in the sequence based on the current column address signal and on the column aggregation signal.

20. An image sensor, comprising:

a plurality of active pixel sensors arranged into a plurality of rows and a plurality of columns, each active pixel sensor including a photosensor configured to generate a sensor signal nominally indicative of an intensity of light incident on the photosensor;

a follower-type amplifier configured to provide a buffered voltage sensor signal based on the sensor signal; and sensor output selection circuitry configured to selectively couple the buffered voltage sensor signal to an output of the active pixel sensor when the row to which the active pixel sensor belongs is selected based on one of a set of row select signals corresponding to that row;

for each column, a column line coupling together the outputs of the active pixel sensors that belong to that column and terminating in a column node for that column;

row select signal generating circuitry configured to generate the set of row select signals to select a corresponding set of plural particular rows such that each active pixel sensor in the selected corresponding set of particular rows provides the buffered voltage sensor signal for that active pixel sensor to the column line for the column to which that active pixel sensor belongs; and column select signal generating circuitry configured to generate a set of column select signals to substantially simultaneously select a corresponding set of plural particular columns such that the column node for each column in the selected corresponding set of plural particular columns is substantially simultaneously coupled to an output node of the image sensor.

21. The image sensor of claim 20, wherein:

the column select signal generating circuitry generates the column select signals based on a column address signal that corresponds to a particular column and on a column aggregation control signal that corresponds to a number of columns in the selected corresponding set of plural particular columns.

22. The image sensor of claim 21, further comprising:

column address signal generating circuitry that generates the column address signal.

23. The image sensor of claim 22, wherein:

the column address signal generating circuitry generates the column address signal based, in part, on the column aggregation control signal.

24. The image sensor of claim 21, wherein:

the set of column select signals is one set of column select signals in a sequence of sets of column select signals;

the set of plural particular columns is one set of plural particular columns in a sequence of sets of plural particular columns; and the column select signal generating circuitry is configured to generate the sequence of sets of column select signals.

25. The image sensor of claim 24, wherein:

the column select signal generating circuitry generates the column select signals based on a column address signal that corresponds to a particular column;

the column address signal is one column address signal in a sequence of column address signals;

the image sensor further comprises column address signal generating circuitry that generates the sequence of column address signals, each column address signal corresponding to a particular column; and the column select signal generating circuitry generates the sequence of sets of column select signals based on the sequence of column address signals and on a column aggregation control signal that corresponds to a number of columns in each selected corresponding set of plural particular columns.

26. The image sensor of claim 25, wherein:

the column address signal generating circuitry generates each next column address signal in the sequence based, in part, on the current column address signal.

27. The image sensor of claim 25, wherein;

the column address signal generating circuitry generating the each next column address signal in the sequence based on the current column address signal and on the column aggregation signal.

28. A camera, comprising:

an image sensor that includes a plurality of active pixel sensors arranged in a plurality of rows and a plurality of columns, each active pixel sensor including a photosensor configured to generate a sensor signal nominally indicative of an intensity of light incident on the photosensor;

a follower-type amplifier configured to provide a buffered voltage sensor signal based on the sensor signal; and sensor output selection circuitry configured to selectively couple the buffered voltage sensor signal to an output of the active pixel sensor when the row to which the active pixel sensor belongs is selected based on a row select signal corresponding to that row;

for each column, a column line coupling together the outputs of the active pixel sensors that belong to that column;

row select signal generating circuitry configured to generate the row select signals to substantially simultaneously select a set of plural particular rows such that each of the active pixel sensors in the selected set of plural particular rows substantially simultaneously provides the buffered voltage sensor signal for that active pixel sensor to the column line for the column to which that active pixel sensor belongs, such that an output node of each column line indicates a collective output signal for the active pixel sensors in the selected set of plural particular rows, belonging to that column;

column select signal generating circuitry configured to generate column select signals to substantially simultaneously select a set of columns such that the collective output signal for each column in the selected set of columns is substantially simultaneously provided to an output node of the image sensor;

a controller configured to control the row select signal generating circuitry and the column select signal generating circuitry; and a memory configured to store signals provided at the output node of the image sensor.

29. The camera of claim 28, and further comprising:

a display device configured to display an image corresponding to the signals stored in the memory.

30. The camera of claim 28, wherein:

the follower-type amplifier includes a field-effect transistor configured as a source-follower amplifier.

31. The camera of claim 30, wherein;

the sensor output selection circuitry includes a field-effect transistor, wherein the gate of rue sensor output selection circuitry field-effect transistor is coupled to the one of the set of row select signals; and the source-follower amplifier field-effect transistor and the sensor output selection circuitry field-effect transistor each have the same conductivity type.

32. The camera of claim 28, wherein;

the follower-type amplifier includes a bipolar transistor configured as an emitter-follower amplifier.

33. The camera of claim 28, wherein:

the row select signal generating circuitry generates the set of row select signals based on a row address signal that corresponds to a particular row and on a row aggregation control signal that corresponds to a number of rows in the selected corresponding set of plural particular rows.

34. The camera of claim 33, further comprising:

row address signal generating circuitry that generates the row address signal.

35. The camera of claim 34, wherein:

the row address signal generating circuitry generates the row address signal based, in part, on the row aggregation control signal.

* * * * *

UNITED STATES PATENT AND TRADEMARK OFFICE
CERTIFICATE OF CORRECTION

PATENT NO. : 6,794,627 B2
DATED : September 21, 2004
INVENTOR(S) : Lyon et al.

It is certified that error appears in the above-identified patent and that said Letters Patent is hereby corrected as shown below:

Delete Drawing Sheet 1 and replace with Drawing Sheet 1. (attached)

Signed and Sealed this

Fifteenth Day of March, 2005

JON W. DUDAS
*Director of the United States Patent and Trademark Office*